United States Patent
Gunderson et al.

(10) Patent No.: US 7,601,209 B1
(45) Date of Patent: Oct. 13, 2009

(54) MULTIPLE FLOW FILTER WITH ACOUSTIC SILENCING

(75) Inventors: Larry T. Gunderson, Sun Prairie, WI (US); Amy K. Luttropp, Madison, WI (US); Ana R. Considine, Portage, WI (US)

(73) Assignee: Cummins Filtration IP Inc., Minneapolis, MN (US)

( * ) Notice: Subject to any disclaimer, the term of this patent is extended or adjusted under 35 U.S.C. 154(b) by 0 days.

(21) Appl. No.: 11/972,268

(22) Filed: Jan. 10, 2008

(51) Int. Cl.
 *B22D 46/00* (2006.01)
(52) U.S. Cl. ............................ 96/387; 55/484; 181/231
(58) Field of Classification Search .................. 96/380, 96/384, 387; 55/484; 181/248, 250, 266, 181/270, 273, 276, 293
See application file for complete search history.

(56) References Cited

U.S. PATENT DOCUMENTS

| | | | |
|---|---|---|---|
| 4,065,276 A * | 12/1977 | Nakaya et al. ................. 96/380 |
| 4,410,430 A * | 10/1983 | Hagler, Jr. ................... 210/446 |
| 4,494,375 A * | 1/1985 | Rao et al. ..................... 60/296 |
| 4,625,511 A * | 12/1986 | Scheitlin et al. ............... 60/299 |
| 4,861,359 A | 8/1989 | Tettman |
| 4,971,612 A | 11/1990 | Loughran |
| 5,016,730 A * | 5/1991 | Kaiser et al. ................. 181/265 |
| 5,140,957 A | 8/1992 | Walker |
| 5,223,011 A | 6/1993 | Hanni |
| 5,417,727 A | 5/1995 | Bowen et al. |
| 5,792,247 A | 8/1998 | Gillingham et al. |
| 5,947,081 A | 9/1999 | Kim |
| 6,009,705 A * | 1/2000 | Arnott et al. .................. 60/312 |
| 6,009,846 A | 1/2000 | Walker, Jr. |
| 6,482,247 B2 | 11/2002 | Jaroszczyk et al. |
| 6,550,446 B1 | 4/2003 | Robley, Jr. |
| 6,688,425 B2 | 2/2004 | Cole et al. |
| 6,702,880 B2 * | 3/2004 | Roberts et al. ................. 96/381 |
| 6,802,388 B2 | 10/2004 | Wolf et al. |
| 6,802,880 B1 | 10/2004 | Wijaya |
| 7,141,101 B2 * | 11/2006 | Amann ....................... 96/380 |
| 7,207,310 B2 * | 4/2007 | Shaw et al. ............... 123/198 E |
| 2003/0213368 A1 * | 11/2003 | Roberts et al. ................. 96/381 |
| 2004/0050618 A1 * | 3/2004 | Marocco ..................... 181/248 |
| 2004/0255660 A1 | 12/2004 | Abdolhosseini et al. |
| 2007/0137155 A1 * | 6/2007 | Furseth et al. ................. 55/482 |
| 2007/0186894 A1 * | 8/2007 | Disch et al. .............. 123/198 E |

OTHER PUBLICATIONS

Delphi Device, admitted prior art, at least as early as Jun. 1, 2004.
WOCO Device, admitted prior art, at least as early as Jun. 1, 2004.
Siemens Device, admitted prior art, at least as early as Jun. 1, 2004.

* cited by examiner

*Primary Examiner*—Duane Smith
*Assistant Examiner*—Sonji Turner
(74) *Attorney, Agent, or Firm*—Andrus, Sceales, Starke & Sawall, LLP; J. Bruce Schelkopf

(57) ABSTRACT

A filter includes a housing with multiple flow passages and filter elements, including at least first and second flow passages therethrough including respective first and second filter elements in parallel. Respective internal dividing walls separate flow passages and are provided with acoustic attenuators.

15 Claims, 4 Drawing Sheets

MULTIPLE FLOW FILTER WITH ACOUSTIC SILENCING

BACKGROUND AND SUMMARY

The invention relates to filters, including air cleaners.

The invention arose during continuing development efforts directed toward filter assemblies providing more efficient use of space, better performance, smaller package size, flexibility of package geometry, and acoustic silencing. The invention further arose during development efforts related to commonly copending U.S. patent application Ser. Nos. 11/044,775, filed Jan. 27, 2005, 11/201,390, filed Aug. 10, 2005, 11/305,563, filed Dec. 16, 2005, all incorporated herein by reference.

In internal combustion engine applications, engine manufacturers are increasingly demanding sound attenuation, particularly in the case of turbo/supercharged engines. The latter requirement is typically satisfied by incorporating a separate sound attenuating device in the system, in addition to the air cleaner, though a more cost effective solution would be desirable.

BRIEF DESCRIPTION OF THE DRAWINGS

Prior Application

FIG. 1 is a perspective cut-away view of a filter in accordance with the '563 application.

FIG. 2 is a perspective view of a portion of the assembly of FIG. 1.

FIG. 3 is a perspective view of the housing of the assembly of FIG. 1.

FIG. 4 is like FIG. 1 and shows a further embodiment.

Present Application

Figure 1:
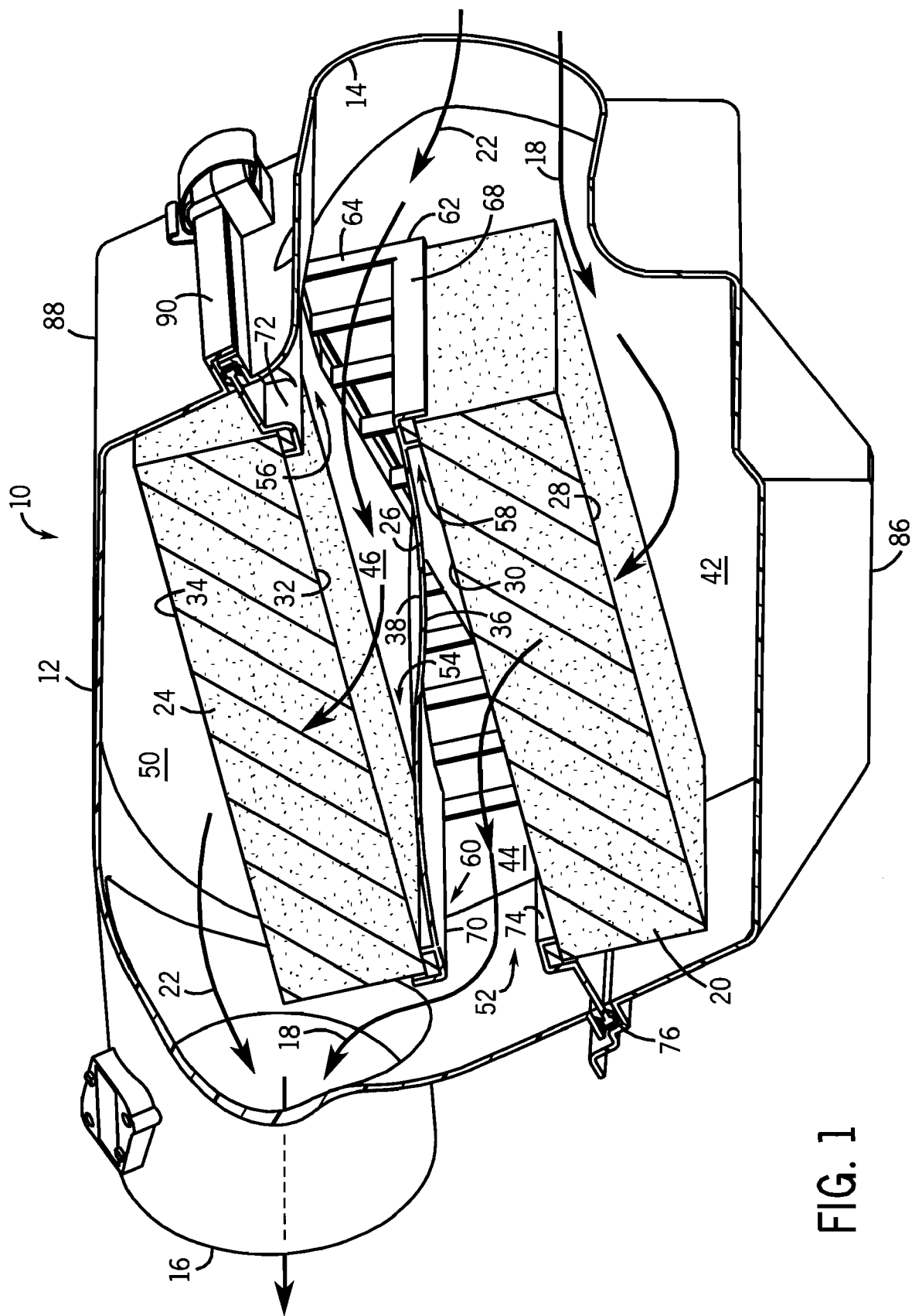
FIGS. 1-4 are taken from above noted U.S. patent application Ser. No. 11/305,563.
Figure 5:
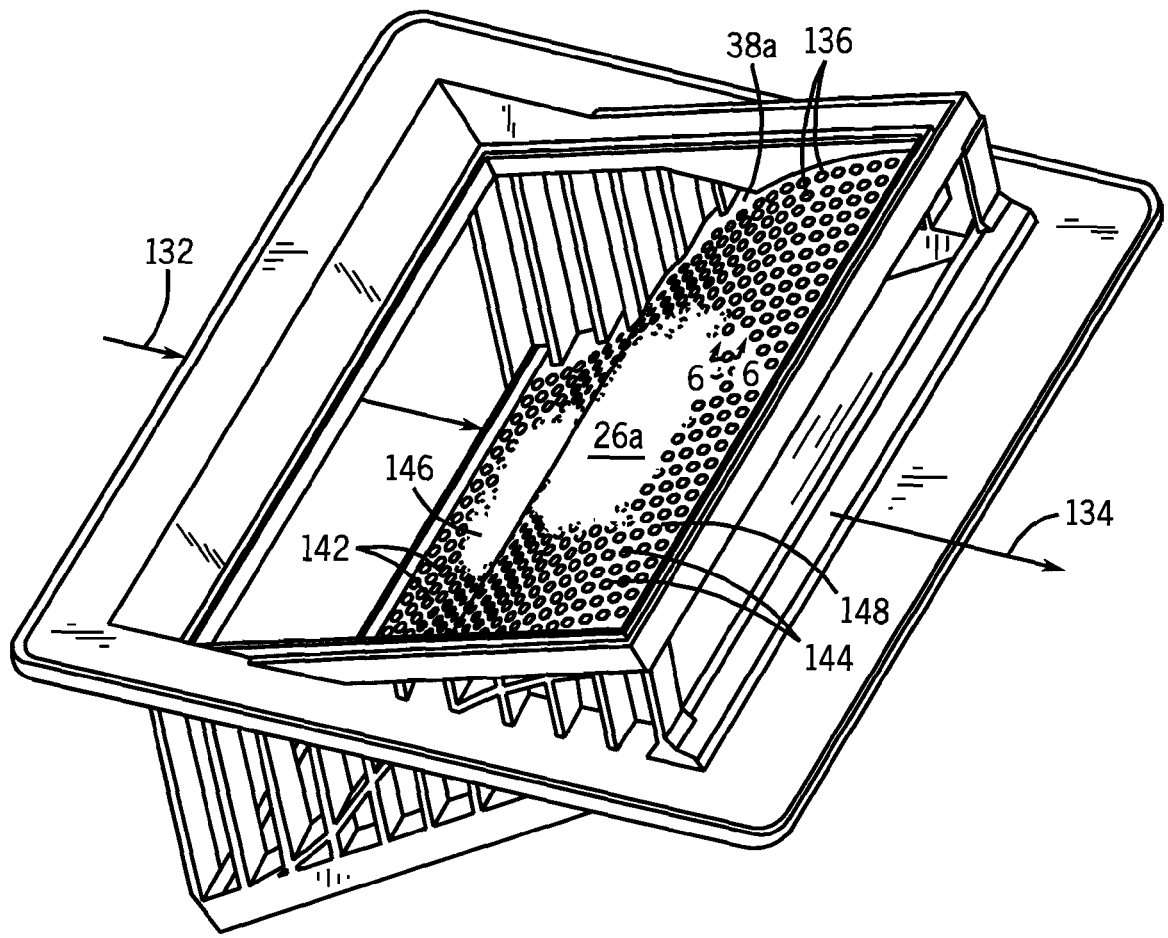

FIG. 5 is a perspective view of a component of FIG. 1 modified in accordance with the present invention.

Figure 6:
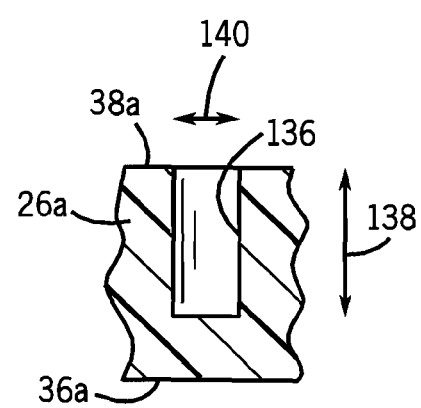

FIG. 6 is a sectional view taken along line 6-6 of FIG. 5.

DETAILED DESCRIPTION

Prior Application

The following description of FIGS. 1-4 is taken from above noted U.S. patent application Ser. No. 11/305,563.

Figure 2:
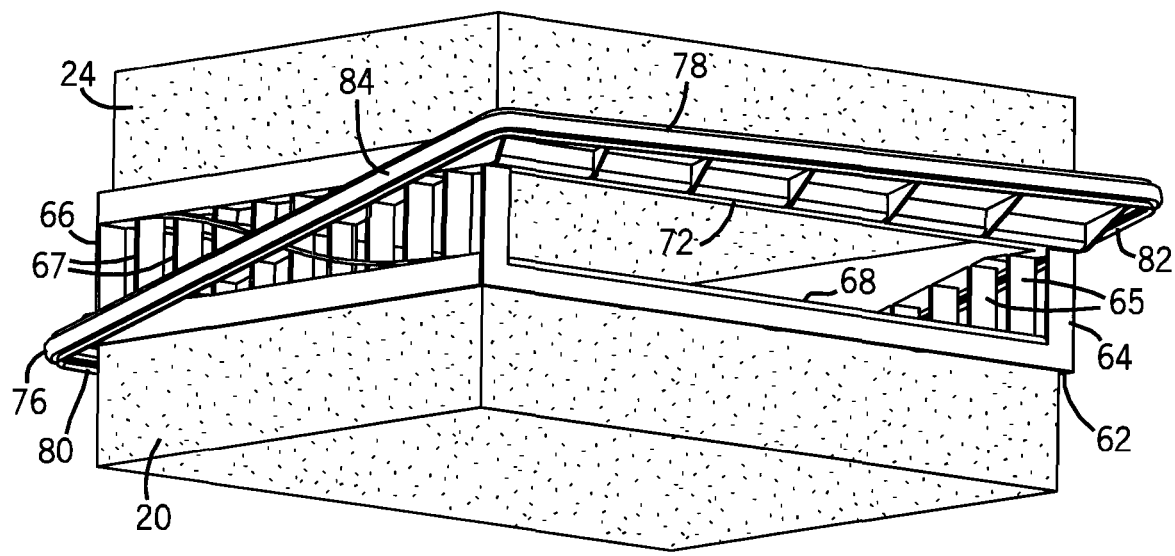
Figure 3:
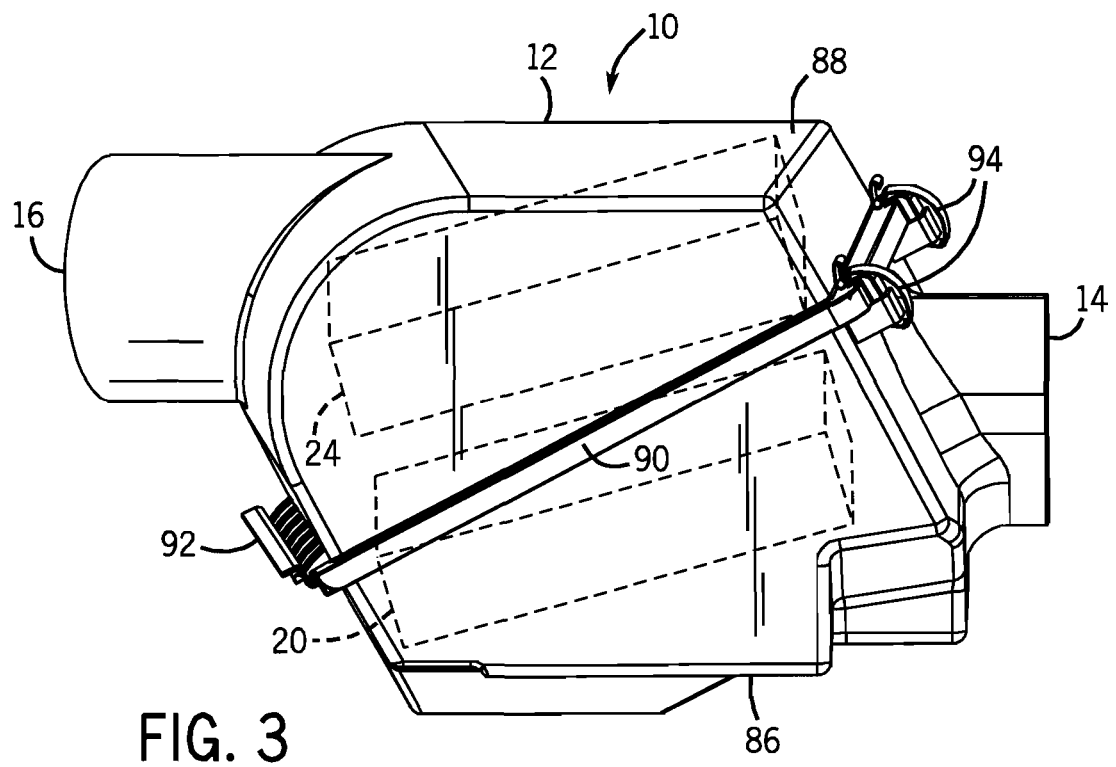

FIGS. 1-3 show a filter 10 including a housing 12 having an inlet 14 and an outlet 16. A first flow passage 18 is provided through the housing from inlet 14 to outlet 16, and includes a first filter element 20 filtering fluid flowing along first flow passage 18. A second flow passage 22 is provided through the housing from inlet 14 to outlet 16, and includes a second filter element 24 filtering fluid flowing along second flow passage 22. First and second flow passages 18 and 22 are in parallel with each other such that incoming fluid flow at inlet 14 is split into first and second parallel flow paths in first and second flow passages 18 and 22, respectively, and flows through first and second filter elements 20 and 24, respectively, and re-joins at outlet 16. First and second flow passages 18 and 22 through respective first and second filter elements 20 and 24 are independent of each other.

Housing 12 includes an internal dividing wall 26 separating first and second flow passages 18 and 22 such that fluid in first flow passage 18 flows through first filter element 20 to the exclusion of and bypassing second filter element 24, and such that fluid in second flow passage 22 flows through second filter element 24 to the exclusion of and bypassing first filter element 20. First filter element 20 has an upstream face 28 receiving incoming fluid along first flow passage 18 from inlet 14. First filter element 20 has a downstream face 30 delivering filtered fluid along first flow passage 18 to outlet 16. Second filter element 24 has an upstream face 32 receiving incoming fluid along second flow passage 22 from inlet 14. Second filter element 24 has a downstream face 34 delivering filtered fluid along second flow passage 22 to outlet 16. Internal dividing wall 26 has a first surface 36 facing downstream face 30 of first filter element 20. Internal dividing wall 26 has a second surface 38 facing oppositely to first surface 36 and facing upstream face 32 of second filter element. Housing 12 has a first sidewall 40 defining a first plenum 42 between first sidewall 40 and upstream face 28 of first filter element 20. Internal dividing wall 26 has the noted first surface 36 defining a second plenum 44 between surface 36 of internal dividing wall 26 and downstream face 30 of first filter element 20. Internal dividing wall 26 has the noted second surface 38 defining a third plenum 46 between surface 38 of internal dividing wall 26 and upstream face 32 of second filter element 24. Housing 12 has a second sidewall 48 defining a fourth plenum 50 between housing sidewall 48 and downstream face 34 of second filter element 24.

In the preferred embodiment, first and second sidewalls 40 and 48 of the housing are spaced by first filter element 20, internal dividing wall 26, and second filter element 24 respectively in serial spatial alignment therewith. Further in the preferred embodiment, housing sidewalls 40 and 48 are spaced by first plenum 42, first filter element 20, second plenum 44, internal dividing wall 26, third plenum 46, second filter element 24, and fourth plenum 50 respectively in serial spatial alignment therewith. First and third plenums 42 and 46 communicate with each other at inlet 14. Second and fourth plenums 44 and 50 communicate with each other at outlet 16.

First and second filter elements 20 and 24 are spaced from each other by a gap 52. Internal dividing wall 26 is a diagonal wall which diagonally spans gap 52 and defines an upstream triangular shaped plenum 46 having a closed corner end 54 at upstream face 32 of second filter element 24, and having an open end 56 communicating with inlet 14. Diagonal wall 26 also defines a downstream triangular shaped plenum 44 having a closed corner end 58 at downstream face 30 of first filter element 20, and having an open end 60 communicating with outlet 16. In the preferred embodiment, diagonal wall 26 has a non-rectilinear wave shape providing increased entrance area at upstream open end 56 of triangular shaped plenum 46 and reduced area at closed corner end 54 of triangular shaped plenum 46, and providing increased exit area at downstream open end 60 of triangular shaped plenum 44 and reduced area at closed corner end 58 of triangular shaped plenum 44.

A spacer 62 supports first and second filter elements 20 and 24 and maintains gap 52 therebetween. Spacer 62 has first and second spacer walls 64 and 66 extending transversely (up-down in FIGS. 1, 2) across gap 52, and extending longitudinally (left-right in FIGS. 1, 2) between open ends 56 and 60 of upstream and downstream triangular shaped plenums 46 and 44. Spacer walls 64 and 66 are laterally spaced from each other by diagonal wall 26 therebetween. The spacer walls have upstream ends communicating with inlet 14, and have downstream ends communicating with outlet 16. Spacer walls 64 and 66 extend longitudinally (left-right in FIGS. 1, 2) between such upstream and downstream ends. The upstream ends of spacer walls 64 and 66 are laterally spaced by open end 56 of upstream triangular shaped plenum 46 therebetween. The downstream ends of spacer walls 64 and 66 are laterally spaced by open end 60 of downstream triangular shaped plenum 44 therebetween. Diagonal wall 26 has an upstream end 68 spanning laterally between the upstream ends of spacer walls 64 and 66. Diagonal wall 26 has a downstream end 70 spanning laterally between the downstream ends of spacer walls 64 and 66. Spacer 62 has an upstream bridging portion 72 extending laterally between the upstream ends of spacer walls 64 and 66 and transversely spaced from upstream end 68 of diagonal wall 26 by open end 56 of upstream triangular shaped plenum 46 therebetween. Spacer 62 has a downstream bridging portion 74 extending laterally between the downstream ends of spacer walls 64 and 66 and spaced transversely from downstream end 70 of diagonal wall 26 by open end 60 of downstream triangular shaped plenum 44 therebetween. The spacer walls may be solid, or may be provided by a plurality of transversely extending ribs 65, 67, respectively, as shown.

A gasket 76, FIG. 2, seals first and second filter elements 20 and 24 and spacer 62 to housing 12. Gasket 76 has an upstream segment 78 extending along upstream bridging portion 72 of spacer 62, a downstream segment 80 extending along downstream bridging portion 74 of spacer 62, and a pair of laterally spaced diagonal side segments 82 and 84 extending diagonally along spacer walls 64 and 66 diagonally oppositely to the diagonal extension of diagonal wall 26. In FIGS. 1 and 2, diagonal side segments 82 and 84 of the gasket extend diagonally from upper right to lower left, whereas diagonal wall 26 extends diagonally from lower right to upper left. Housing 12 is provided by a pair of shrouds 86 and 88, FIGS. 1, 3 removably mated to each other along an interface 90 coincident with gasket 76 including diagonal side segments 82 and 84 of the gasket. Inlet 14 is in shroud housing section 86. Outlet 16 is in shroud housing section 88. The shrouds are removably mounted to each other, for example, by hinges or clips such as 92 at one end, and clamps such as 94 at the other end. The shrouds preferably pinch and compress gasket 76 therebetween along the entire perimeter thereof including gasket segments 78, 80, 82, 84.

Figure 4:
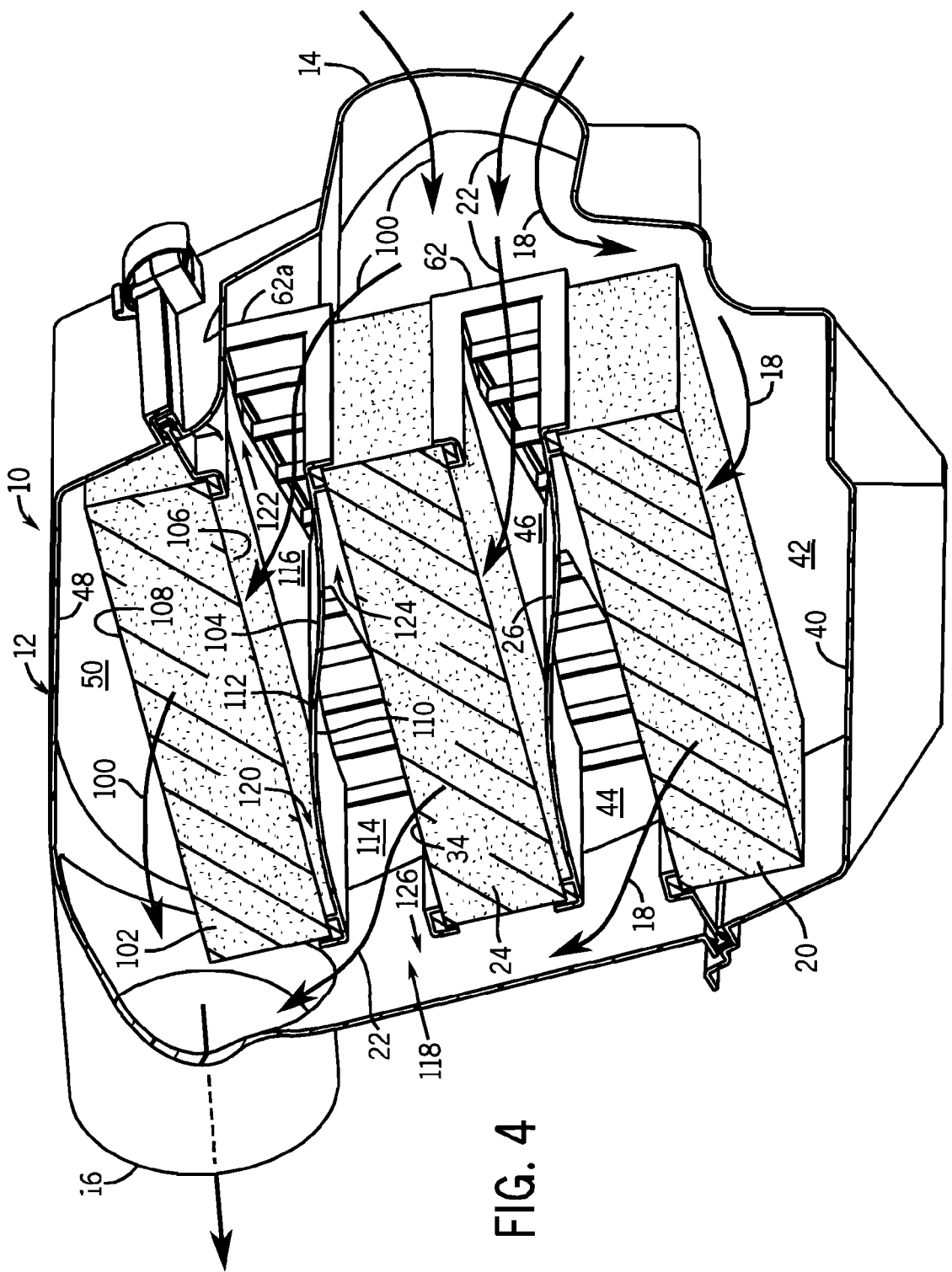

The above principles may be applied to multiple flow filter systems wherein the filter housing may have multiple flow passages including the noted first and second flow passages and one or more additional flow passages therethrough. FIG. 4 shows a further embodiment and uses like reference numerals from above where appropriate to facilitate understanding. A third flow passage 100 is provided through housing 12 from inlet 14 to outlet 16, and includes a third filter element 102 filtering fluid flowing along third flow passage 100. First and second and third flow passages 18 and 22 and 100 are in parallel with each other such that incoming fluid flow at inlet 14 is split into first and second and third parallel flow paths in first and second and third flow passages 18 and 22 and 100, respectively, and flows through first and second and third filter elements 20 and 24 and 102, respectively, and re-joins at outlet 16. First and second and third flow passages 18 and 22 and 100 through respective first and second and third filter elements 20 and 24 and 102 are independent of each other. The housing has a second internal dividing wall 104 separating second and third flow passages 22 and 100. Fluid in first flow passage 18 flows through first filter element 20 to the exclusion of and bypassing second and third filter elements 24 and 102. Fluid in second flow passage 22 flows through second filter element 24 to the exclusion of and bypassing and first and third filter elements 20 and 102. Fluid in third flow passage 100 flows through third filter element 102 to the exclusion of and bypassing first and second filter elements 20 and 24. Third filter element 102 has an upstream face 106 receiving incoming fluid along third flow passage 100 from inlet 14, and a downstream face 108 delivering filtered fluid along third flow passage 100 to outlet 16. Second internal dividing wall 104 has a first surface 110 facing downstream face 34 of second filter element 24, and a second surface 112 facing oppositely to first surface 110 and facing upstream face 106 of third filter element 102. Internal dividing wall 104 has the noted first surface 110 defining a plenum 114 between surface 110 and downstream face 34 of second filter element 24. Internal dividing wall 104 has the noted second surface 112 defining a plenum 116 between surface 112 and upstream face 106 of third filter element 102. Housing sidewalls 40 and 48 in FIG. 4 are spaced by first filter element 20, first internal dividing wall 26, second filter element 24, second internal dividing wall 104, and third filter element 102 respectively in serial spatial alignment therebetween. More specifically in FIG. 4, sidewalls 40 and 48 are spaced by plenum 42, first filter element 20, plenum 44, first internal dividing wall 26, plenum 46, second filter element 24, plenum 114, second internal dividing wall 104, plenum 116, third filter element 102, and plenum 50 respectively in serial spatial alignment therebetween. Plenums 42 and 46 and 116 communicate with each other and with inlet 14. Plenums 44 and 114 and 50 communicate with each other and with outlet 16. Second and third filter elements 24 and 102 are spaced from each other by a gap 118, by a second spacer 62a comparable to spacer 62. Internal dividing wall 104 is a diagonal wall which diagonally spans gap 118 and defines an upstream triangular shaped plenum 116 having a closed corner end 120 at upstream face 106 of third filter element 102, and having an open end 122 communicating with inlet 14. Diagonal wall 104 also defines a downstream triangular shaped plenum 114 having a closed corner end 124 at downstream face 34 of second filter element 24, and having an open end 126 communicating with outlet 16. Diagonal wall 104 preferably has a non-rectilinear wave shape providing increased entrance area at upstream open end 122 of triangular shaped plenum 116 and reduced area at closed corner end 120 of triangular shaped plenum 116, and providing increased exit area at downstream open end 126 of triangular shaped plenum 114 and reduced area at closed corner end 124 of triangular shaped plenum 114. Fourth, fifth, and so on, multiple filter elements and flow passages may be provided in accordance with the above teachings.

Present Application

The improvements and modifications in accordance with the present application are illustrated in FIGS. 5, 6, which use like reference numerals from above where appropriate to facilitate understanding.

Internal dividing wall 26 of FIG. 1 has been modified and replaced by internal dividing wall 26a in FIG. 5, which is a perspective view from above rotated from the position of FIG. 1 to show incoming flow at 132 (entering at housing inlet 14), and outgoing flow at 134 (exiting at housing outlet 16). Internal dividing wall 26a has quarter wave resonators formed by blind holes 136 therein, FIGS. 5, 6. Internal dividing wall 26a has first and second oppositely facing surfaces 36a and 38a, comparable to surfaces 36 and 38 of FIG. 1. Quarter wave resonator blind holes 136 are formed in at least one of first and second surfaces 36a and 38a. In one preferred embodiment, quarter wave resonator blind holes 136 are formed in the upstream facing surface 38a for acoustic attenuation and dampening of incoming noise. In other embodiments, the quarter wave resonator blind holes are formed in downstream facing surface 36a for attenuation of noise traveling back along the air intake system from the engine. In other embodiments, the quarter wave resonator blind holes are formed in both of the upstream and downstream facing surfaces 38a and 36a, respectively.

The quarter wave resonator attenuation frequency is controlled by the depth of blind holes 136. In one preferred embodiment, the blind holes have a depth 138 in the range of 4 to 8 mm. Further in the preferred embodiment, the blind holes have a width 140 in the range of 2 to 3 mm. The noted width is transverse to the noted depth.

In a further embodiment, internal dividing wall 26a has a first set of one or more quarter wave resonator blind holes 142 of a first size, and one or more additional sets 144 of one or more quarter wave resonator blind holes of a different size, for attenuation of different frequencies. In one embodiment, the first set of quarter wave resonator blind holes 142 has a first depth, and second set 144 of quarter wave resonator blind holes has a second depth less than the noted first depth. In another embodiment, internal dividing wall 26a has a first area 146 of a first density of quarter wave resonator blind holes, and a second area 148 of a second density of quarter wave resonator blind holes, with the second density being less than the first density. In a further embodiment, the quarter wave resonator blind holes vary in at least one of depth and density along the wave shape along at least one of the upstream and downstream surfaces 38a and 36a of the diagonal wall 26a. In a further embodiment, the quarter wave resonator blind holes decrease in depth as upstream surface 38a of diagonal wall 26a extends from open end 56 of upstream triangular shaped plenum 46 to closed corner end 54 of upstream triangular shaped plenum 46.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems, and method steps described herein may be used alone or in combination with other configurations, systems, and method steps. It is to be expected that various equivalents, alternatives, and modifications are possible within the scope of the appended claims.

What is claimed is:

1. A filter comprising:
    a housing having an inlet and an outlet;
    a first flow passage through said housing from said inlet to said outlet, and including a first filter element filtering fluid flowing along said first flow passage;
    a second flow passage through said housing from said inlet to said outlet, and including a second filter element filtering fluid flowing along said second flow passage;
    an internal dividing wall separating said first and second flow passages such that fluid in said first flow passage flows through said first filter element, and fluid in said second flow passage flows through said second filter element, said internal dividing wall having quarter wave resonators formed by blind holes therein.

2. The filter according to claim 1 wherein:
    said first filter element has an upstream face receiving incoming fluid along said first flow passage from said inlet, and a downstream face delivering filtered fluid along said first flow passage to said outlet;
    said second filter element has an upstream face receiving incoming fluid along said second flow passage from said inlet, and a downstream face delivering filtered fluid along said second flow passage to said outlet;
    said internal dividing wall has a first surface facing said downstream face of said first filter element, and a second surface facing oppositely to said first surface and facing said upstream face of said second filter element;
    said quarter wave resonator blind holes are formed in at least one of said first and second surfaces of said internal dividing wall.

3. The filter according to claim 2 wherein quarter wave resonator attenuation frequency is controlled by depth of said blind holes, and wherein said blind holes have a depth in the range of 4 to 8 mm.

4. The filter according to claim 3 wherein said blind holes have a width in the range of 2 to 3 mm, said width being transverse to said depth.

5. The filter according to claim 2 wherein said one surface of said internal dividing wall has a first set of one or more quarter wave resonator blind holes of a first size, and one or more additional sets of one or more quarter wave resonator blind holes of a different size, for attenuation of different frequencies.

6. The filter according to claim 5 wherein said first set of quarter wave resonator blind holes have a first depth, and comprising a second said additional set of one or more quarter wave resonator blind holes having a second depth less than said first depth.

7. The filter according to claim 2 wherein said one surface of said internal dividing wall has a first area of a first density of said quarter wave resonator blind holes, and has a second area of a second density of said quarter wave resonator blind holes, said second density being less than said first density.

8. The filter according to claim 2 wherein each of said first and second surfaces of said internal dividing wall have said quarter wave resonator blind holes formed therein.

9. The filter according to claim 2 wherein said internal dividing wall separates said first and second flow passages such that fluid in said first flow passage flows through said first filter element to the exclusion of and bypassing said second filter element, and such that fluid in said second flow passage flows through said second filter element to the exclusion of and bypassing said first filter element.

10. The filter according to claim 2 wherein said quarter wave resonator blind holes are formed in said second surface of said internal dividing wall facing said upstream face of said second filter element and also facing said inlet.

11. The filter according to claim 1 wherein:
    said first filter element has an upstream face receiving incoming fluid along said first flow passage from said inlet, and a downstream face delivering filtered fluid along said first flow passage to said outlet;
    said second filter element has an upstream face receiving incoming fluid along said second flow passage from said inlet, and a downstream face delivering filtered fluid along said second flow passage to said outlet;
    said first and second filter elements are spaced from each other by a gap;
    said internal dividing wall comprises a diagonal wall which diagonally spans said gap and defines an upstream triangular shaped plenum having a closed corner end at said upstream face of said second filter element, and having an open end communicating with said inlet, and defines a downstream triangular shaped plenum having a closed corner end at said downstream face of said first filter element, and having an open end communicating with said outlet, said diagonal wall having an upstream surface facing and defining said upstream triangular shaped plenum, and having a downstream surface facing and defining said downstream triangular shaped plenum;

said quarter wave resonator blind holes are formed in at least one of said upstream and downstream surfaces of said diagonal wall.

12. The filter according to claim 11 wherein said diagonal wall has a non-rectilinear wave shape providing increased entrance area at said open end of said upstream triangular shaped plenum and reduced area at said closed corner end of said upstream triangular shaped plenum, and providing increased exit area at said open end of said downstream triangular shaped plenum and reduced area at said closed corner end of said downstream triangular shaped plenum.

13. The filter according to claim 12 wherein said quarter wave resonator blind holes vary in at least one of depth and density along said wave shape along said one of said upstream and downstream surfaces of said diagonal wall.

14. The filter according to claim 11 wherein said quarter wave resonator blind holes are formed in said upstream surface of said diagonal wall.

15. The filter according to claim 14 wherein said quarter wave resonator blind holes decrease in depth as said upstream surface of said diagonal wall extends from said open end of said upstream triangular shaped plenum to said closed corner end of said upstream triangular shaped plenum.

* * * * *